July 11, 1967  R. C. WHITEHEAD, JR  3,330,161
FLUID DENSITY MEASURING APPARATUS
Filed Jan. 25, 1965  2 Sheets-Sheet 1

INVENTOR.
ROBERT C. WHITEHEAD JR.
BY
*Arthur H. Swanson*
ATTORNEY

July 11, 1967 R. C. WHITEHEAD, JR 3,330,161
FLUID DENSITY MEASURING APPARATUS
Filed Jan. 25, 1965
2 Sheets-Sheet 2
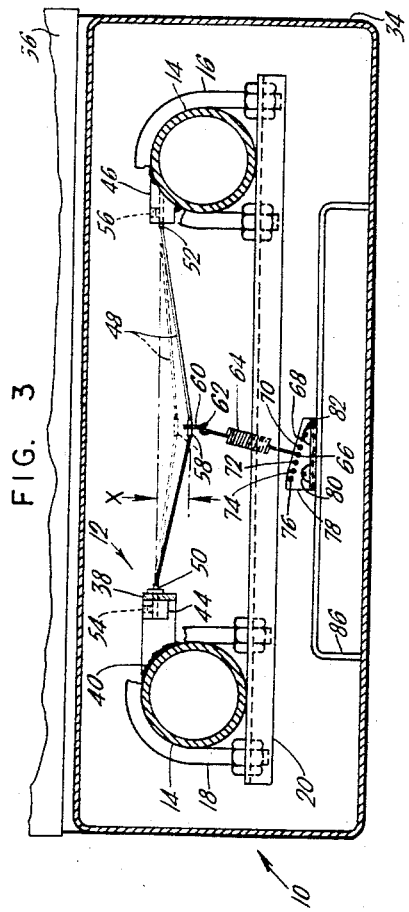
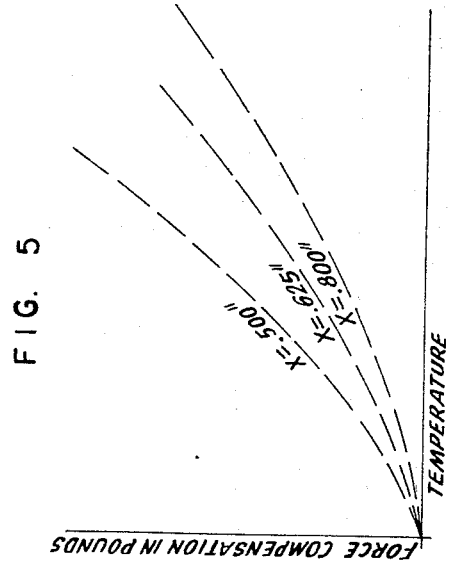
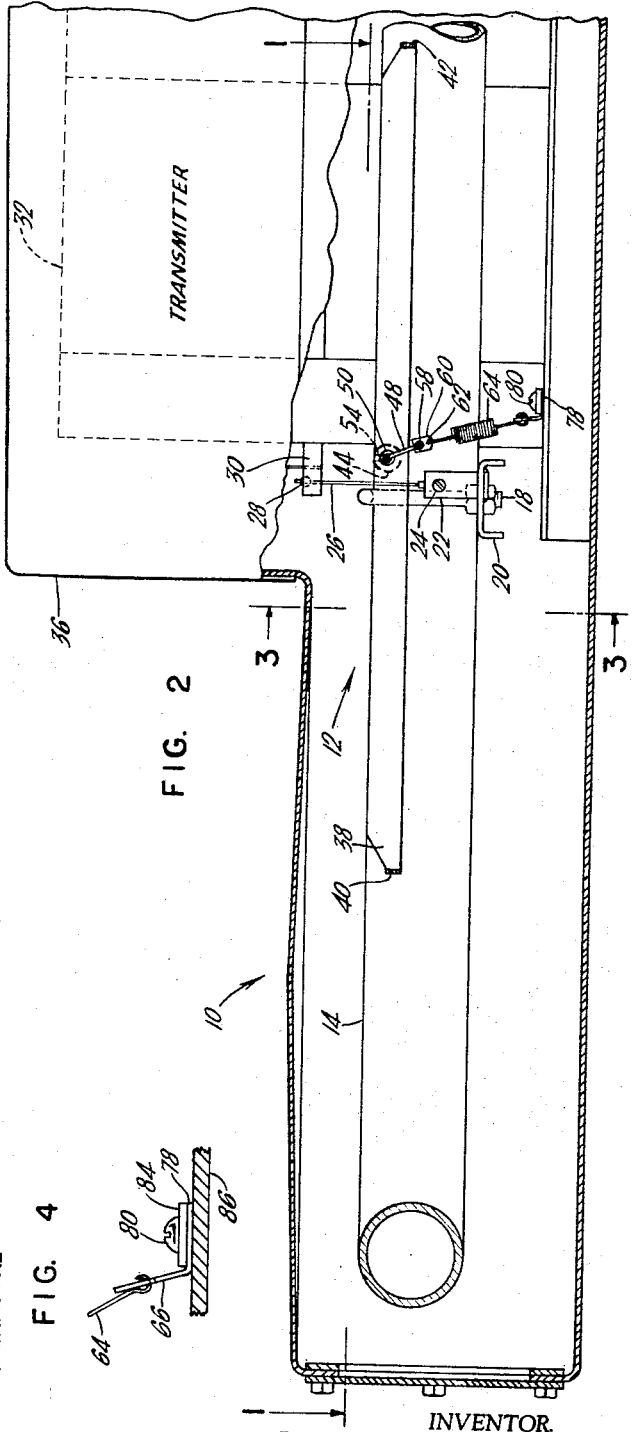
INVENTOR.
ROBERT C. WHITEHEAD JR.
BY
ATTORNEY

United States Patent Office 3,330,161
Patented July 11, 1967

3,330,161
FLUID DENSITY MEASURING APPARATUS
Robert C. Whitehead, Jr., Oreland, Pa., assignor to Honeywell Inc., Minneapolis, Minn., a corporation of Delaware
Filed Jan. 25, 1965, Ser. No. 427,906
6 Claims. (Cl. 73—434)

ABSTRACT OF THE DISCLOSURE

A temperature compensating apparatus useful in measuring the density of a fluid that employs a weighing means and a tube containing the fluid that is connected to the weighing means to apply a force to the weighing means proportional to the weight of the fluid in the tube and in accordance with changes in the weight of the fluid caused by changes occurring in the temperature of the fluid. The temperature compensating apparatus is comprised of a flexible bowed shaped member having its opposite ends in fixed engagement with spaced apart portions of the tube, a spring operably connected at one end to a stationary member and by way of a flexible connection for movement with the flexible bowed member to apply a force to the tube that will negate the force caused by changes occurring in the temperature of the fluid in the tube.

---

It is an object of the present invention to provide a density-measuring instrument with a temperature-compensating apparatus so that the density-measuring instrument can record a more accurate indication of the density of the material which it has under measurement.

It is another object of the present invention to disclose an apparatus for use with a density-measuring instrument that will apply a correcting temperature-compensating force to the density-measuring instrument as changes occur in the temperature of the material under measurement.

More specifically, it is another object of the present invention to provide a temperature-compensating apparatus of the aforementioned type that can be mounted on the external wall of a flow tube, which apparatus will simultaneously sense changes that occur in the temperature of a fluid flowing through the tube and apply a temperature-compensating force that is proportional to the magnitude of that change to an instrument that is being employed to take a density measurement of the flowing fluid.

Prior to the present invention, it had been the practice to employ a fluid-filled, temperature-sensing system that is comprised of a temperature-sensing bulb inserted through the wall of a flow conduit, a capillary tube extending between the bulb and a transmitter, which, in turn, is connected with a distensible member such as a bellows or a bourdon in a density-measuring instrument in order to negate the adverse effect of changes in temperature of a fluid passing through the flow conduit.

Since the bowed-shaped temperature-sensing element to be hereinafter disclosed employs parts external to the flow conduit which can sense temperature changes occurring in a fluid within the flow conduit, it has the following unique advantages over the previously-mentioned fluid-filled systems:

(1) It does not obstruct the flow of fluid passing through the flow conduit and, therefore, does not allow bacteria to accumulate as fluid food products or other similar products are passed therethrough.

(2) It requires a considerably fewer number of costly parts and is obviously less cumbersome and less expensive to manufacture.

It is still another object of the invention to employ a bowed-shaped strip made of a material having a low coefficient of expansion, such as a material tradenamed INVAR, between two portions of a tube as a means by which changes in the temperature of a fluid in the tube can be sensed and applied as a non-linear corrective force to a density-measuring instrument.

It is another object of the invention to fixedly mount the ends of a bowed-shaped strip of the aforementioned type at different selected spaced-apart distances from one another on the wall of a conduit so that a different, greatly magnified, desired, non-linear motion can be transmitted by this strip which can be used as a first self-adjusting means to nullify the non-linear effect that a change in the temperature of the fluid in the conduit has on a meter that is employed to take a density measurement of this fluid.

It is another object of the invention to employ a means of adjusting the slack condition of a pliable substantially non-stretchable member that extends between the center of the aforementioned bowed-shaped strip that is mounted on one leg of a U-shaped conduit and an opposite side wall portion that forms another leg of the conduit so that a second non-linear preselected temperature adjustment for the fluid in the U-shaped tube is provided.

It is still another object of the invention to employ a third non-linear adjustable means in the form of a spring that can be adjusted to extend at different angles between the ends of the aforementioned pliable member and the stationary member in order to provide different gradients for the aforementioned temperature-compensating apparatus.

It is still a more specific object of the present invention to connect the aforementioned apparatus to the exterior wall of a U-shaped weighing tube so that changes in temperature of the fluid in the tube will not adversely effect the true density measurement being made by an associated weight-indicating means such as the weight-indicating means disclosed in the Robert C. Whitehead, Jr., United States Patent No. 3,151,775, issued on October 6, 1964.

A better understanding of the present invention may be had from the following detailed description when read in connection with the accompanying drawings in which:

FIG. 1 discloses a plan view of the aforementioned density-measuring U-tube, showing a typical way of mounting the unique bowed-shaped temperature-compensating apparatus thereon, as viewed along Section Line 1—1 of FIG. 2;

FIG. 2 shows a front elevational view of the temperature-compensating apparatus shown in FIG. 1;

FIG. 3 shows an end elevation view taken along the Section Line 3—3 of FIG. 2;

FIG. 4 shows an enlarged view of the spring-retaining clip shown in FIGS. 1–3; and FIG. 5 shows how the adjustment of the temperature-compensating apparatus provides this apparatus with different temperature-pounds of force compensation curves.

Figure 1:
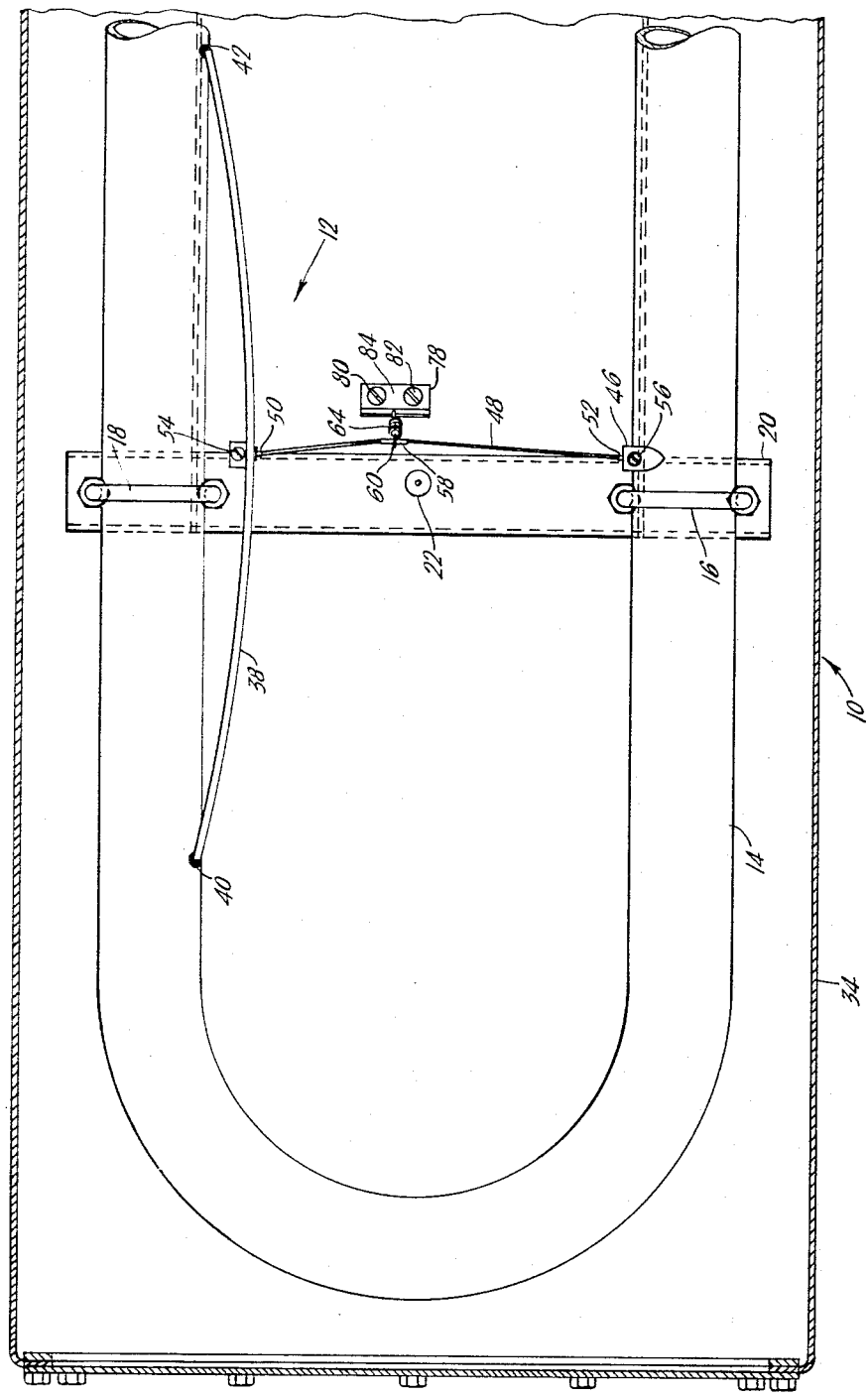

As shown in FIGS. 1–3, the previously-mentioned density-measuring apparatus 10 to which the unique temperature-compensating apparatus 12 disclosed herein is attached is comprised of a U-shaped tube 14 mounted by means of U-shaped tie bolt members 16, 18 on a channel support member 20. This channel support member 20, in turn, has a member 22 fixedly connected to it at a point where the center of gravity of the U-tube 14 and the material in the U-tube are coincident with one another. The member 22, in turn, is fixedly connected by a screw connection 24 to the lower end of the flexible member 26 whose upper end is shown supported by means of a ball connection 28 to a movable force-balance beam 30 of a transmitter 32. The transmitter 32 is of a force balance type disclosed in detail, e.g., in the aforementioned Robert C. Whitehead, Jr., Patent No. 3,151,775.

The transmitter 32 is constructed to produce a pneumatic output pressure signal whose magnitude will be proportionally altered as changes occur in the weight of the fluid in the completely filled U-tube 14. Figures 1–3 also disclose separable upper and lower casings 34, 36 for the aforementioned U-tube 14 and transmitter 32 to keep the parts inclosed therein free from acquiring any undesired particles which are present in the atmosphere.

FIG. 1 shows one of the parts of the unique temperature-compensating apparatus 12 as being comprised of a bowed-shaped member 38 whose opposite ends are fixedly connected, for example, by suitable welding material at 40, 42 to the outer wall surface of the U-shaped tube 14.

FIGS. 1 and 2 show a first bushing 44 fixedly connected in any suitable manner, such as by welding material, to the bowed-shaped member 38. A second bushing 46 is also shown fixedly connected in a similar manner to the outer surface of the U-shaped tube 14.

A slack, pliable, substantially non-stretchable member which may be in the form of a metal wire 48 is shown having sleeves 50, 52 mounted thereon which are in crimped, fixed engagement with opposite ends of the wire 48. These sleeves 50, 52 extend through their associated bushings 44, 46 and are retained in an adjustably-fixed position therein by means of the set screws 54, 56.

A tube 58 is shown surrounding and crimped in fixed engagement with the central portion of the wire 48 that is centrally located between its ends. The upper end of a lug 60 is fixedly connected by suitable welding material, not shown, to the central portion of the tube 58. The lower end of the lug 60 is provided with a wall portion 62 that forms an aperture therein for accommodating the insertion of an upper end of a spring 64. The lower end of the spring 64 is shown retained in fixed engagement with an apertured wall portion 66 that forms one of a series of apertures 66, 68, 70, 72, 74, 76 in the upper portion of the lug 78.

Lug 78 is shown fixedly connected by screw connections 80, 82 and a spring plate 84 to a base plate 86 that, in turn, is fixedly connected by suitable welding material, not shown, to lower casing 34.

When the distance X shown in FIG. 3 is altered by adjusting the ends 50, 52 of wire 48 in its associated bushings 54, 56 the temperature-force compensating curve for the characterized compensation, which the non-linear temperature-compensating apparatus disclosed herein will provide, will be shown in FIG. 5.

From the aforementioned description of the elements, it can be seen that a unique apparatus is provided which will provide any number of different selected non-linear characteristic forms of compensation by:

(1) Altering the bowed condition of the bowed member 38 so that the ends of the bowed member 38 can be welded in place at points on the U-tube that are closer together or further apart than that shown in FIG. 1 to shift all of the temperature-compensating curves of FIG. 5 in an up or down direction from that shown, and (2) Altering the distance X or, in other words, the slack condition of the wire 48 and by altering the angle at which the lower end of the spring 64 is positioned with respect to its upper end so that a gradient change can be introduced and a different change in the shape of each of the non-linear temperature-compensating curves, shown in FIG. 5, effected.

The temperature-compensating apparatus disclosed herein thus provides a very versatile sanitary unit which is useful in taking an accurate measurement of the magnitude of many different fluids, such as water based fluids, etc., and in supplying an apparatus that is measuring the density of any one of these fluids with an individually selected, non-linear, temperature-compensating force that represents the temperature characteristic of the fluid under measurement.

What is claimed is:

1. Improvements in an apparatus to measure the density of a fluid having a weighing means and a tube containing the fluid and operably connected to the weighing means to apply a force thereto that is proportional to the weight of the fluid and the magnitude of the temperature of the fluid, the improvement comprising a bent flexible member extending between spaced-apart portions of the tube and mounted for expansion and contraction with the tube as the magnitude of the temperature of the fluid is respectively increased and decreased, a flexible connection having end portions thereof connected to and extending between a bent portion of the flexible member and a second portion of the tube, a stationary member, and a biasing means extending between the stationary member and a portion of the flexible connection that is located between its ends to thereby apply a nonlinear temperature compensating spring gradient force to the tube in a direction that will negate the force that is caused by changes in the magnitude of the temperature of the fluid in the tube.

2. The temperature-compensating apparatus as defined in claim 1, wherein the bent flexible member is constructed of a material having a low coefficient of expansion.

3. The temperature-compensating apparatus as defined in claim 1, wherein the bent flexible member is connected to portions of the tube that form its external surface.

4. Improvements in an apparatus to measure the density of a fluid having a weighing means and a tube containing the fluid and operably connected to the weighing means to apply a force thereto that is proportional to the weight of the fluid and the magnitude of the temperature of the fluid, the improvement comprising a self-compensating means to apply a non-linear temperature-compensating force to the weighing tube that is transporting the fluid therethrough in order to substantially negate the adverse force altering effect that a change in temperature of a fluid passing through the tube has on the apparatus employed to measure the density of the fluid in the tube, the self-compensating means comprising a bowed flexible member extending between spaced-apart portions of the tube and mounted for expansion and contraction with the tube as the magnitude of the temperature of the fluid is respectively increased and decreased, a bowed flexible connection having end portions thereof connected to and extending between a portion of the bowed flexible member and a second portion of the tube, a stationary member and a biasing means extending between the stationary member and a portion of the bowed flexible connection that is located between its ends to thereby apply a non-linear temperature compensating spring gradient force to the tube in a direction that will negate the force caused by changes in the magnitude of the temperature of the fluid in the tube.

5. The temperature-compensating apparatus as defined in claim 1, wherein a separate bushing is fixedly connected to the bent flexible member and to the second portion of the tube, each bushing being positioned for slidably receiving any one of a selected number of lengths of a different end portion of the flexible connection and wherein a securing means is employed in each bushing to retain the end portions of the flexible connection in fixed engagement therewith.

6. The temperature-compensating apparatus as defined in claim 1, wherein the stationary member is provided with a series of spaced-apart apertured wall portions forming selected connections for one end of the biasing means and being spaced at equal distance from an inclined surface of the stationary member, and wherein each of the apertured wall portions is positioned at a different angle from the connection formed between the other end of the biasing means and the flexible connection to thereby provide a means for altering the non-linear spring force gradient characteristic being applied by the biasing means to the flexible member.

References Cited

UNITED STATES PATENTS

| 2,321,175 | 6/1943 | Binckley | 73—434 |
| 3,187,584 | 6/1965 | Hudson | 73—434 |
| 3,225,603 | 12/1965 | Stephenson et al. | 73—434 |

FOREIGN PATENTS 559,336  12/1922  France.

RICHARD C. QUEISSER, *Primary Examiner.*

J. D. SCHNEIDER, *Assistant Examiner.*